United States Patent
Johnson et al.

(10) Patent No.: US 9,494,028 B2
(45) Date of Patent: Nov. 15, 2016

(54) MEASURING SPEED OF ROTATION OF A DOWNHOLE MOTOR

(75) Inventors: Ashley Johnson, Milton (GB); Michael P. Barrett, Histon (GB);
(Continued)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 184 days.

(21) Appl. No.: 13/993,633

(22) PCT Filed: Dec. 13, 2011

(86) PCT No.: PCT/IB2011/003017
§ 371 (c)(1),
(2), (4) Date: Sep. 27, 2013

(87) PCT Pub. No.: WO2012/080810
PCT Pub. Date: Jun. 21, 2012

(65) Prior Publication Data
US 2014/0028293 A1    Jan. 30, 2014

Related U.S. Application Data

(60) Provisional application No. 61/422,409, filed on Dec. 13, 2010, provisional application No. 61/422,412, (Continued)

(51) Int. Cl.
*G01V 3/18* (2006.01)
*E21B 44/02* (2006.01)
(Continued)

(52) U.S. Cl.
CPC ............. *E21B 44/02* (2013.01); *E21B 4/02* (2013.01); *E21B 44/00* (2013.01); *E21B 45/00* (2013.01);
(Continued)

(58) Field of Classification Search
CPC ............. G01P 3/00; G01P 3/44; G01P 3/42; G01P 3/66; G01P 3/487; E21B 4/02;
(Continued)

(56) References Cited

U.S. PATENT DOCUMENTS

| 2,958,511 | A | 11/1960 | Pfefferle |
| 2,958,821 | A | 11/1960 | Webb |

(Continued)

FOREIGN PATENT DOCUMENTS

| RU | 20081367147 A | 7/2010 |
| WO | 2010043951 | 4/2010 |

(Continued)

OTHER PUBLICATIONS

International Search Report and Written Opinion of PCT Application No. PCT/IB2011/003019 dated Aug. 7, 2012: pp. 1-11.
(Continued)

*Primary Examiner* — Son Le

(57) ABSTRACT

The invention relates to downhole motors for rotating drill bits. The downhole motors may comprise stators, turbines or the like. The drilling motor may comprise a drilling apparatus comprising a drill bit connected to a rotor rotatably housed within a stator (or a turbine rotor in a housing), the rotor comprising at least one magnetic field source or magnetic field detector, and the stator comprising at least one magnetic field source if the rotor comprises a magnetic field detector or comprising at least one magnetic field detector if the rotor comprises a magnetic field source, thereby allowing the rotation speed of the rotor relative to the stator to be measured.

18 Claims, 5 Drawing Sheets

(75) Inventors: Benjamin P. Jeffryes, Histon (GB);
Walter David Aldred, Thriplow (GB);
Maurice Ringer, Cambridge (GB)

Related U.S. Application Data filed on Dec. 13, 2010, provisional application No. 61/422,420, filed on Dec. 13, 2010.

(51) Int. Cl.

| | | |
|---|---|---|
| *E21B 4/02* | (2006.01) | |
| *E21B 47/00* | (2012.01) | |
| *G01P 3/487* | (2006.01) | |
| *E21B 45/00* | (2006.01) | |
| *E21B 44/00* | (2006.01) | |
| *G01P 3/44* | (2006.01) | |

(52) U.S. Cl.
CPC .............. *E21B 47/00* (2013.01); *G01P 3/44* (2013.01); *G01P 3/487* (2013.01); *H02K 11/215* (2016.01)

(58) Field of Classification Search
CPC ........... H02K 29/14; H02K 29/08; G01D 5/12
USPC ............. 324/207.22, 207.2, 207.24, 207.25, 324/207.26, 173, 179; 318/721, 138, 254, 318/439, 490; 310/68 B, 173, 186, 254
See application file for complete search history.

(56) References Cited

U.S. PATENT DOCUMENTS

| | | | |
|---|---|---|---|
| 4,545,214 A | 10/1985 | Kinoshita | |
| 4,647,853 A | 3/1987 | Cobern | |
| 4,941,951 A | 7/1990 | Sheppard et al. | |
| 5,368,108 A | 11/1994 | Aldred et al. | |
| 6,234,259 B1 * | 5/2001 | Kuckes et al. | 175/73 |
| 6,498,474 B1 * | 12/2002 | Turner | 324/165 |
| 2003/0205998 A1 * | 11/2003 | Heremans et al. | 324/165 |
| 2004/0035608 A1 * | 2/2004 | Meehan | E21B 47/16 175/40 |
| 2004/0251898 A1 | 12/2004 | Morys et al. | |
| 2005/0155349 A1 | 7/2005 | Sugiura et al. | |
| 2006/0162962 A1 | 7/2006 | Koederitz et al. | |
| 2006/0279243 A1 * | 12/2006 | Schachtl et al. | 318/466 |
| 2007/0226348 A1 | 9/2007 | Grabarnik et al. | |
| 2007/0263488 A1 * | 11/2007 | Clark | 367/87 |
| 2008/0156531 A1 | 7/2008 | Boone et al. | |
| 2008/0164062 A1 | 7/2008 | Brackin et al. | |
| 2008/0170841 A1 * | 7/2008 | Schneider et al. | 388/800 |
| 2009/0039872 A1 * | 2/2009 | Fischer | G01D 5/145 324/207.13 |
| 2009/0236149 A1 | 9/2009 | Main | |
| 2010/0301846 A1 * | 12/2010 | Lee | 324/207.25 |

FOREIGN PATENT DOCUMENTS

| | | |
|---|---|---|
| WO | 2010065646 | 6/2010 |
| WO | 2012080812 | 6/2012 |
| WO | 2012080819 | 6/2012 |

OTHER PUBLICATIONS

International Search Report and Written Opinion of PCT Application No. PCT/IB2011/003017 dated Aug. 30, 2012: pp. 1-10.
International Search Report and Written Opinion of PCT Application No. PCT/IB2011/003045 dated Sep. 17, 2012: pp. 1-11.
Office Action in RU application 2013132442 on Jul. 28, 2015, 2 pages.
Decision to Grant for corresponding Russian Application Serial No. 2013132442/07, dated Nov. 27, 2015 with English translation, 12 pages.

* cited by examiner

MEASURING SPEED OF ROTATION OF A DOWNHOLE MOTOR

CROSS-REFERENCE TO RELATED APPLICATIONS

This application is a United States National Stage Application under 35 U.S.C. §371 and claims priority to Patent Cooperation Treaty Application Number PCT/IB2011/003017 filed Dec. 13, 2011, which claims the benefit of U.S. Provisional Patent Application Ser. Nos. 61/422,420 filed Dec. 13, 2010, 61/422,412 filed Dec. 13, 2010, and 61/422,409 filed Dec. 13, 2010. All four of these applications are incorporated herein by reference in their entireties.

TECHNICAL FIELD

Embodiments of the present invention relates to a drilling apparatus comprising a drill bit connected to a rotor rotatably housed within a stator e.g. a positive displacement motor or turbine.

BACKGROUND

Downhole motors are used in the hydrocarbon industry to apply power at a downhole location to a drill bit in oil and/or gas wells for drilling applications. The downhole motor, sometimes referred to as a mud motor, is positioned at the bottom of a drillstring and coupled via an output shaft with a drill bit. Drilling fluid, sometimes referred to as drilling mud or simply mud, is pumped down the drillstring and through the downhole motor. The downhole motor uses the force of the pumped/flowing drilling fluid to produce a mechanical output, a rotation of the output shaft and, in turn, the drill bit.

Although there are different types of downhole/mud motors, the most commonly used type today is a positive displacement motor which uses an elongated, helically-shaped rotor within a corresponding helically shaped stator. The flow of drilling fluid or mud between the stator and rotor causes the rotor to orbit within the stator eccentrically about the longitudinal axis of the stator. The rotor itself rotates about its longitudinal axis and also orbits around the central longitudinal axis of the stator. This eccentric orbit and rotation of the rotor is transferred by a suitable transmission assembly, such as a universal joint assembly, to produce a concentric rotation for the output shaft.

The downhole motor is a kind of downhole dynamic drilling tool that converts the power of drilling mud to a rotation of the drill bit; an application of torque and speed to the drill bit. The advantages of using a downhole motor is that it provides: an increased rate of penetration; better hole deviation control; reduced drill string failure rate.

A downhole motor, mud motor or drilling motor may also be referred to as a Progressive Cavity Positive Displacement Pump that may be disposed on the drillstring to provide additional power to the bit during a drilling process. As described above, the downhole motor uses the drilling fluid to create eccentric motion in the power section of the motor, which is transferred as concentric power to the drill bit. The downhole motor uses different rotor and stator configurations to provide optimum performance for the desired drilling operation; typically the number of lobes and the length of power assembly may be increased to provide greater horsepower. In certain applications, compressed air or other compressed gases may be used to input power to the downhole motor. A rotation of the bit while using a downhole motor may be from about 60 rpm to over 100 rpm.

Downhole motors may comprise a top sub, which connects the downhole motor to the drillstring; the power section, which consists of the rotor and the stator; the transmission section, where the eccentric power from the rotor is transmitted as concentric power to the bit; the bearing assembly which protects the tool from off bottom and on bottom pressures; and the bottom sub which connects the downhole motor to the bit.

The use of downhole motors is greatly dependent on financial efficiency. In straight vertical holes, the mud motor may be used for increased rate of penetration (ROP), or to minimize erosion and wear on the drill string, since the drill string does not need to be turned as fast. However, the majority of downhole motor use is for directional drilling. Although other methods may be used to steer the drill to directionally drill a borehole, a downhole motor may be the most cost effective method.

In some aspects, the downhole motor may be configured to include a bend section to provide for directional drilling. Typically, downhole motors can be modified in a range of around zero to four degrees to provide for directional drilling with approximately six increments in deviation per degree of bend. The amount of bend is determined by rate of climb needed to reach the target zone. By using a measurement while drilling (MWD) Tool, a directional driller can steer the bit, which is driven by the downhole motor, to the desired target zone.

The power section of the downhole motor consists of the stator and the rotor. In certain downhole motors, the stator comprises a rubber sleeve on the wall of a steel tube, where the inside of the rubber sleeve defines a spiral structure with a certain geometric parameter. The rotor comprises a shaft, such as a steel shaft, that may be coated with a wear resistant coating, such as chrome and may have a helical profile configured to run/turn/rotate inside the stator.

In the drilling procedure, drilling fluid is pumped downhole through the drill pipe at a given rate and pressure. The downhole motor converts the hydraulic energy of the drilling fluid passing through the power section into mechanical energy, rotation and torque. This mechanical energy is transferred from the downhole motor to the drill bit.

An alternative to using a positive displacement motor is to employ a turbine, in a process often referred to as turbodrilling. In the turbodrill method, power is generated at the bottom of the hole by mud-operated turbines. The turbodrill consists of four basic components: the upper, or thrust, bearing; the turbines, the lower bearing; and the bit. In operation, mud is pumped through the drill pipe, passing through the thrust bearing and into the turbine. In the turbine, stators attached to the body of the tool divert the mud flow onto the rotors attached to the shaft. This causes the shaft, which is connected to the bit, to rotate. The mud passes through a hollow part of the shaft in the lower bearing and through the bit, as in rotary drilling, to remove cuttings, cool the bit, and perform the other functions of the drilling fluid. The capacity of the mud, which is the power source, is a parameter in determining the rotational speed.

Multistage high efficiency reaction turbine blades extract hydraulic energy from the flowing mud stream and convert it to mechanical energy (torque and rotation) to drive the drill bit. Each turbine stage consists of a stator, fixed to the body of the tool, and a rotor fixed to the output shaft. These are designed to work in unison, directing and accelerating the mud as it passes through each stage. To achieve the high power and torque levels necessary in performance drilling applications, complete tools are built with approximately 150 sets of identical rotor and stator pairs. To ensure a long life the rotors and stators are manufactured using high performance alloys, which are resistant to both erosion and corrosion.

Similar to a positive displacement motor, the turbodrill generates mechanical power through a pressure drop across the drive system coupled with the fluid flow rate. Generally, the greater the pressure drop capacity of the tool, the greater the potential for delivering mechanical power to the bit. Because the turbodrill power generation system is entirely mechanic, it is capable of supporting an extremely high pressure drop that creates greater mechanical power compared with a mud motor.

In view of their benefits, positive displacement motors (PDMs) and turbines are used prolifically in oilfield drilling operations to increase the rotary speed and torque supplied to the bit during drilling.

Although so widely used, it is, however, usually unknown exactly how much rotary speed is generated during a drilling operation using a PDM and/or a turbine.

The speed of rotation of the drilling motor or turbine may be extremely important in controlling the direction of drilling of the drilling system, ROP, stability of the drilling system, vibration of the drilling system, effectiveness of the drilling system and/or the like. As such, to effectively operate a drilling system using a downhole motor in essentially real-time it is important to determine the rotational properties of the downhole motor or turbine.

SUMMARY

In this specification the term drilling turbine, shaft, drive shaft and/or rotor may be used interchangeably to describe the element(s) rotating in the downhole motor and driving the rotation of the drill bit.

Thus, in a first aspect, the present invention relates to a drilling apparatus comprising a drill bit connected to a rotor rotatably housed within a stator, the rotor comprising at least one magnetic field source or magnetic field detector, and the stator comprising at least one magnetic field source if the rotor comprises a magnetic field detector or comprising at least one magnetic field detector if the rotor comprises a magnetic field source.

Thus, as the rotor rotates with respect to the stator, the detector on the rotor or stator will detect the fluctuations in magnetic field experienced. By interpreting the fluctuations the speed of rotation of the rotor relative to the stator can be established.

Thus, in a second aspect, the invention relates to a method of determining the rotation speed of a rotor housed within a stator, the method comprising measuring the magnetic field detected at the at least one magnetic field detectors in an apparatus defined herein and determining the rotation speed from the measurements.

As discussed above, the rotor and stator may form a positive or cavity displacement motor or a turbine. However, other rotor and stator arrangements are also possible.

The speed of rotation of the rotor can, for example, be determined by timing the duration between peaks in the detected magnetic field. Additionally, the speed of rotation can be determined by performing a frequency analysis on the measured magnetic field.

It is generally desirable however, to also monitor the direction of rotation as well as the speed of rotation. In order for the direction of rotation to be established the magnetic field sources and detectors must be positioned to provide an indication of the direction of rotation in the detected magnetic field.

It will also be apparent that if more than one magnetic field source is present, then for them to be useful in the present invention they should all be located either on the rotor or on the stator. Likewise, if more than one magnetic field detector is present, then they should all be located either on the rotor or on the stator. Any magnetic field sources or detectors which may be present but are not located with the majority of the sources or detectors on the rotor or sensor cannot contribute to the measurement of speed or direction of rotation of the rotor with respect to the stator for the purposes of the invention.

It will also be appreciated that a magnetic field source operates both a north pole and a south pole, which will be physically spaced apart.

Thus, for the direction of rotation to be determined, there must be a detector and any two of an additional detector, a first magnetic field source and a second magnetic field source, distinctive from the first, arranged never to be collinear with the centre of the rotor at any point during a full revolution of the rotor within the stator. Additional detectors and sources may be present, but this minimum condition provides for detection of the direction of rotation.

Such an arrangement provides an asymmetric orientation of the magnetic sources and detectors, enabling the direction of rotation to be established.

A convenient way to provide distinctive magnetic fields is to arrange the first source to be a north pole and the second source to be a south pole. Another option is to ensure that the detected strength of one magnetic field source is measurably different to the second one, e.g. by arranging for distances between sources and detectors to be different or arranging for one source to be stronger than the other.

For example, in an embodiment, the rotor comprises a single magnetic field source and the stator comprises two magnetic field detectors, wherein the detectors are not collinear with the centre of the rotor. In this case, the direction of rotation can be established by cross-correlation of the magnetic fields detected by the two detectors. By comparing the times when the two detectors experience the magnetic field, the direction of rotation can be established.

In another embodiment, the rotor comprises a single magnetic field source but wherein the north and south poles are positioned so as not to be collinear with the centre of the rotor. Additionally, the stator comprises a single magnetic field detector. In this case, the single detector experiences both the north and south poles during a single revolution of the rotor and the direction of rotation can be determined by comparing the times between experiencing the north and south poles.

Thus, in one embodiment the direction of motion is measured by cross-correlating the measured magnetic field experienced by at least two magnetic field detectors. In another embodiment, the direction of motion is measured by comparing the time between peaks and/or troughs of at least two distinctive detected magnetic fields.

In one embodiment, additional magnetic field sources and detectors are provided, in order to provide additional measurements of speed and direction, improving the accuracy and introducing redundancy into the arrangement in the case of instrument failure. Thus, in certain embodiments the drilling apparatus comprises at least two magnetic field sources and at least two magnetic field detectors.

The source of a magnetic field may be suitably provided by a magnet, which may be any kind of magnet, e.g. permanent or temporary.

The magnetic field detector may comprise a magnetometer. In certain aspects, a total field magnetometer may be used to provide a detector that is insensitive to rotation in the Earth's magnetic field and to provide for accurate interpretation of the motion of the shaft.

In one embodiment of the present invention, the measurement of the relative motions may be transmitted, by for example electromagnetic transmission, to surface to provide for controlling operation of the downhole drilling motor. Transmission may be via mud pulse telemetry, wired pipe, acoustic transmission, wireless transmission, electromagnetic transmission and/or the like. In other embodiments, a downhole processor may be used to control the downhole motor using the relative motion data. In yet other embodiments, a downhole motor may process the relative motion data and transmit data processed from the relative motion data to the surface.

In embodiments of the present invention, the relative motion data may be delivered from one element of the drillstring and/or to the surface through various techniques including: short hop electromagnetic transmission, slip rings and cables, pressure pulsation, acoustic and/or the like.

BRIEF DESCRIPTION OF THE DRAWINGS

The invention will now be illustrated, by way of example only, and with reference to the following figures, in which.

DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the scope of the invention as set forth herein.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Figure 1:
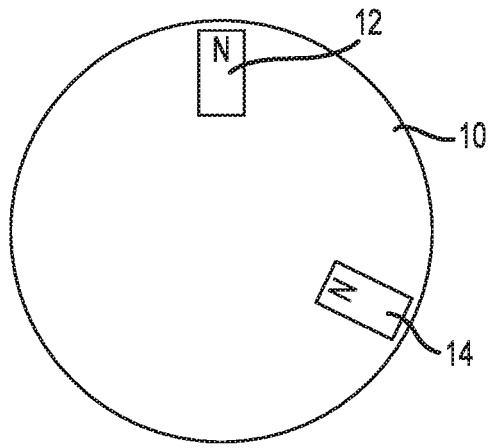
FIG. 1 is a schematic representation of the cross-section through a rotor for use in a downhole mud motor according to the present invention.

Turning to the figures, FIG. 1 shows a cross-section through a rotor 10 comprising a first magnetic field source 12 and a second magnetic field source 14, in accordance with an embodiment of the present invention. The first magnetic field source 12 is oriented with its poles collinear with the centre of the rotor with its north pole outermost. The second magnetic field source 14 is oriented with its poles collinear with the centre of the rotor 10 with its south pole outermost. In an embodiment of the present invention, the rotor 10 is positioned within a housing 20 in which the rotor 10 may rotate. In certain aspects, the housing 20 may comprise a stator.

Thus, in certain embodiments, with one detector positioned anywhere on an appropriate stator, both the speed and direction of rotation of the rotor can be determined. In such an embodiment, the detector sees a positive then a negative signal change that is unequally phased, which can be processed by a processor (not shown) to determine the rate and/or the direction of rotation of the shaft relative to the body of the motor or the turbine.

In some embodiments of the present invention, the rotor 10 of FIG. 1 may comprise a central turbine element. In such, embodiments the rotor 10 may comprise one or more vanes and the rotor 10 may be disposed with in the housing 20. The vanes of the rotor 10 provide for converting motion of a fluid through the housing 20 into rotational motion of the rotor 10. In such embodiments, the system comprises a turbine that may be used to drive a drill bit in a drilling system.

Figure 2:
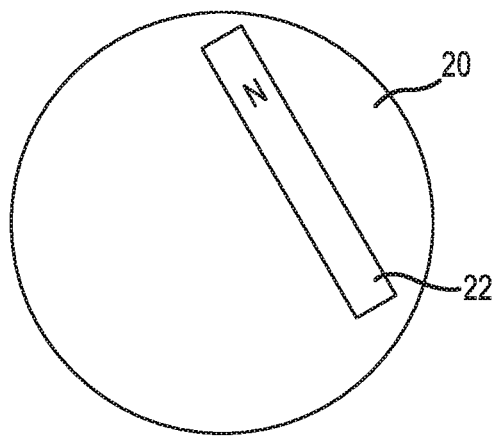
FIG. 2 is a schematic representation of the cross-section through another rotor for use in a downhole mud motor according to the present invention.

FIG. 2 shows a cross-section through a rotor 20 comprising one magnetic field source 22 having both north and south poles, in accordance with an embodiment of the present invention. However, in this embodiment, in view of the fact that the poles are not collinear with the centre of the rotor, a single detector positioned anywhere on an appropriate stator, can measure both the speed and direction of rotation of the rotor with respect to the stator.

Figure 3:
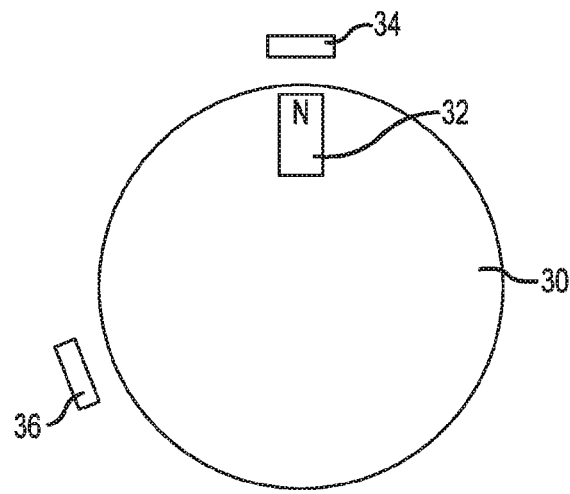
FIG. 3 is a schematic representation of the cross-section through a further rotor for use in a downhole mud motor according to the present invention.

FIG. 3 shows a cross-section through a rotor 30 comprising one magnetic field source 32 with its poles collinear with the centre of the rotor, in accordance with an embodiment of the present invention. In this embodiment, two detectors 34, 36 are used to measure both the speed of rotation as well as the direction of rotation of the rotor 30.

In an embodiment of the present invention, the direction of rotation can be determined by cross-correlation of the responses measured by the two detectors 34, 36.

Figure 4:
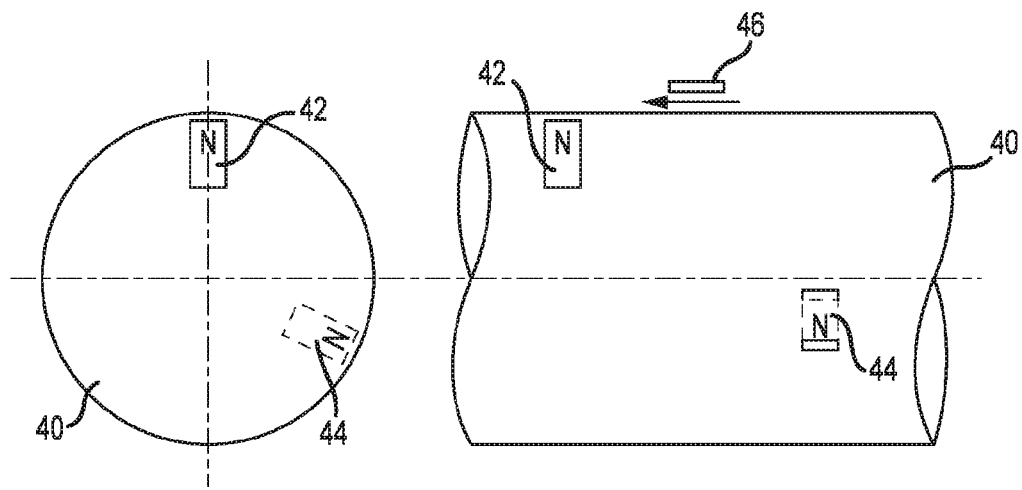
FIG. 4 is a schematic representation of the cross-section together with a side view through a further rotor for use in a downhole mud motor according to the present invention.

FIG. 4 shows a cross-section through a rotor 40 comprising a first magnetic field source 42 and a second magnetic field source 44, in accordance with an embodiment of the present invention. In this embodiment, both the first magnetic field source 42 and the second magnetic field source 14 are oriented with their poles collinear with the centre of the rotor with their north pole outermost. In this embodiment, at least one magnetometer 46 is used for measurements.

Figure 5:
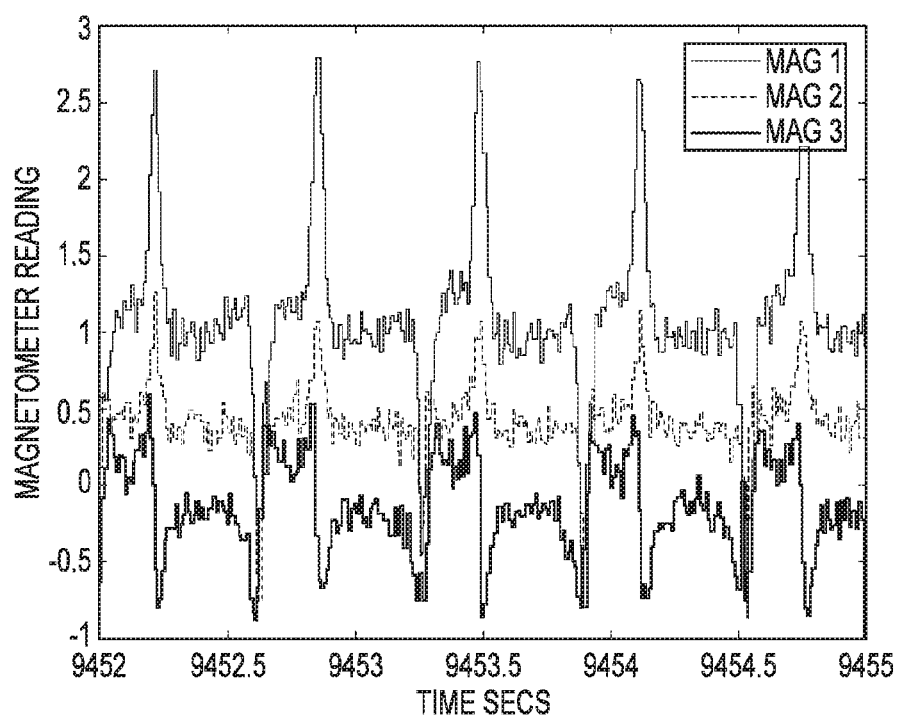
FIG. 5 is a chart showing the magnetometer reading versus time for the arrangement shown in FIG. 1.

FIG. 5 illustrates actual measured magnetometer readings from three magnetometers located in a stator surrounding a rotor as depicted in FIG. 1, in accordance with an embodiment of the present invention.

Figure 6:
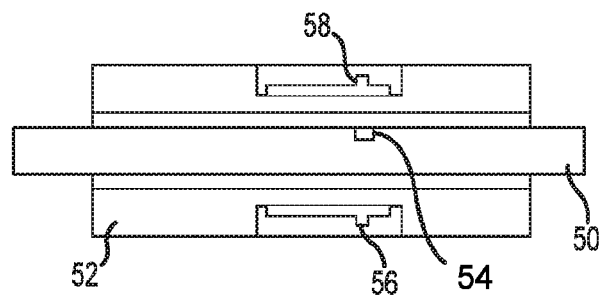
FIG. 6 is a schematic representation of the side view in section of a rotor and stator arrangement for use as a downhole mud motor according to the present invention.

FIG. 6 shows a side view schematic representation in section of a combination of a rotor 50 and a stator 52, according to an embodiment of the present invention. The rotor contains a magnetic field source 54 and the stator contains magnetic field detectors 56, 58.

In the embodiment of FIG. 6, because the magnetic field source 54 and the detectors 56, 58 are collinear with the centre of the stator at two points in a single revolution of the stator, the arrangement is only capable of determining the speed of rotation of the rotor and is not capable of determining the direction of rotation.

Figure 7:
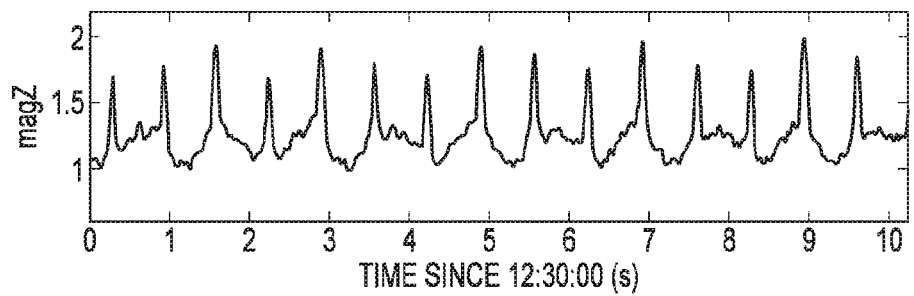
FIG. 7 is a trace of a magnetometer reading from an arrangement according to the present invention.

FIG. 7 shows a chart of the measured magnetic field in the arrangement shown in FIG. 6, in accordance with an embodiment of the present invention. The measured times between the first four peaks are 0.6412, 0.6522. 0.6492 and 0.6532 seconds. In accordance with an embodiment of the present invention, this gives a measurement of the rotation speed of 93.57, 91.99, 92.42 and 91.85 rpm respectively. In some embodiments, such measurements may be averaged, e.g. using a moving average, to give a readout of the measured rotational speed at any one time.

In embodiments of the present invention, the rotor/turbine speeds may be processed by a processor that may be located downhole and/or at the surface and the processed speeds may be used to control the operation of the downhole motor and/or the drilling process.

Figure 8:
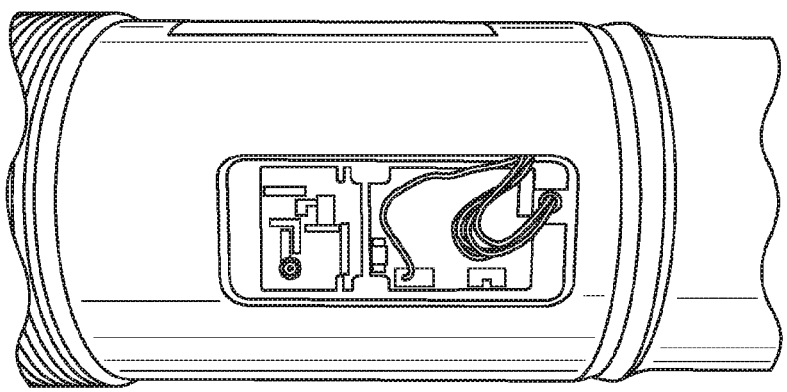
FIG. 8 is an image of the external body of a stator in an arrangement according to the present invention with part of the casing removed to show the DMM magnetometer board inside.

FIG. 8 shows an image of the actual apparatus illustrated in FIG. 6, in accordance with an embodiment of the present invention, which apparatus generated the data in FIG. 7.

Figure 9:
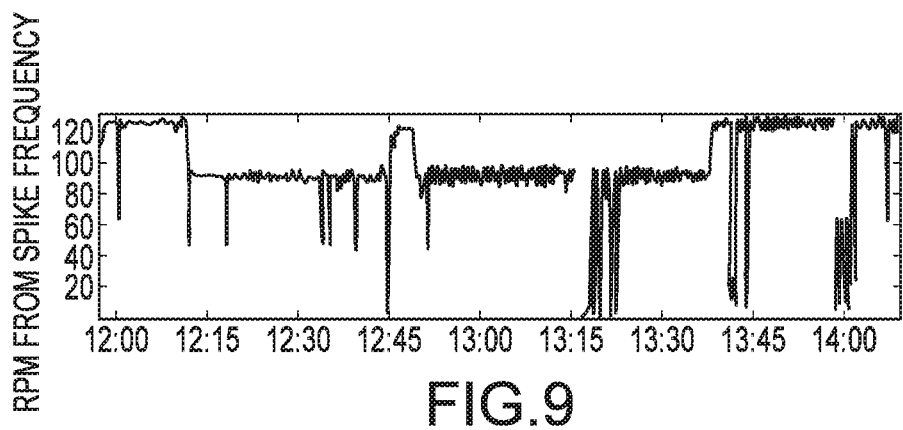
FIG. 9 is a plot of the calculated rotor speed with respect to the stator based on measurements taken from an embodiment according to the invention.

FIG. 9 shows a plot of the measured rotational speeds, measured in accordance with an embodiment of the present invention, as a function of time over a longer period of time. In an embodiment of the present invention, the measured data may be processed to show that the speed of operation of the downhole motor changes from 120 to 90 rpm during the two minutes of measured data.

Figure 10:
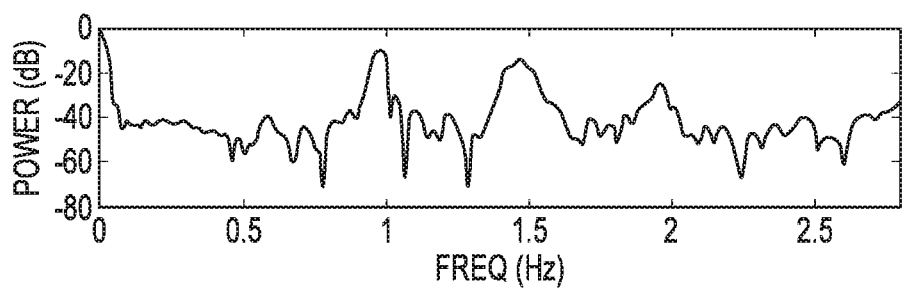
FIG. 10 is a chart showing the distribution of measured frequencies of magnetic field during a drilling run employing an apparatus according to the present invention.

FIG. 10 shows a frequency analysis of the data measured by the magnetometers, in accordance with an embodiment of the present invention. In embodiments of the present invention, the frequency data may be processed to determine that peaks occur at around 1.0, 1.5 and 2.0 Hz. The peaks at 1.5 and 2.0 relate to the rotation of the rotor in the stator. The peak at 1.0 relates to the rotation of the stator in the Earth's magnetic field.

Figure 11:
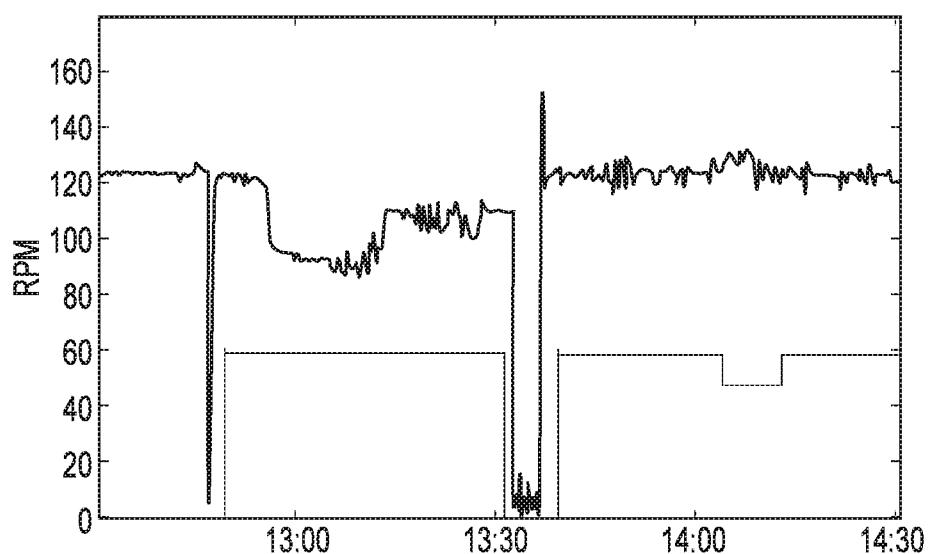
FIG. 11 is a chart showing the calculated rotational speed of a rotor with respect to a stator in an arrangement according to the present invention.

FIG. 11 shows a plot of the rotation speeds shown in FIG. 9 but with the stator rotation speed superimposed. Processing the data shows that the stator is rotating at about 60 rpm in the Earth's magnetic field.

The data processed from signals from the rotor systems in accordance with embodiments of the present invention provide for determining the rotational properties of the rotor during drilling processes. Thus, in embodiments of the present invention operation of the rotor/downhole motor may be monitored and/or controlled.

The invention has now been described in detail for the purposes of clarity and understanding. However, it will be appreciated that certain changes and modifications may be practiced within the scope of the appended claims. Moreover, in the foregoing description, for the purposes of illustration, various methods and/or procedures were described in a particular order. It should be appreciated that in alternate embodiments, the methods and/or procedures may be performed in an order different from that described.

The invention claimed is:

1. A drilling apparatus for drilling a borehole through an earth formation, comprising:
   a drill bit connected to a downhole motor comprising a rotor and a stator at the bottom end of a drillstring in the borehole, with the rotor rotatably housed within the stator and the drill bit connected to the rotor, wherein:
   the rotor is configured in use to be driven into motion by drilling fluid pumped down the borehole;
   the rotor comprises at least a first magnetic field source or at least a first magnetic field detector;
   the stator comprises at least a first magnetic field source if the rotor comprises a first magnetic field detector or comprises at least a first magnetic field detector if the rotor comprises a first magnetic field source; and
   further wherein either:
   (i) the rotor or stator comprises both the first magnetic field source and a second magnetic field source, distinctive from the first, arranged never to be collinear with the centre of the rotor at any point during a full revolution of the rotor within the stator; or
   (ii) the rotor or stator comprises both the first magnetic field detector and a second magnetic field detector; and
   a processor configured to process signals generated by the at least one magnetic field detector, wherein the processor is configured to process a rotation speed and a direction of rotation of the rotor from the signals from the at least one magnetic field detector.

2. A drilling apparatus according to claim 1, wherein the first source is a north pole and the second source is a south pole.

3. A drilling apparatus according to claim 1, comprising first and second magnetic field sources, wherein the detected strength of the first magnetic field source is measurably different to the detected strength of the second one.

4. A drilling apparatus according to claim 1, which comprises at least two magnetic field sources and at least two magnetic field detectors.

5. A drilling apparatus according to claim 1, wherein the processor is configured to process a rotation speed of the stator from the signals from the magnetic field detector.

6. A drilling apparatus according to claim 1 wherein the at least one magnetic field detector comprises a total field magnetometer.

7. A drilling apparatus according to claim 1 wherein:
the rotor comprises a first magnetic field source and a second magnetic field source distinctive from the first magnetic field source and arranged so that the first and second magnetic field sources are never collinear with each other and with the center of the rotor at any point during a full revolution of the rotor within the stator;
the stator comprises at least one magnetic field detector; and
the processor is configured to process both a rotation speed and a direction of rotation of the rotor from the signals from the at least one magnetic field detector.

8. A drilling apparatus according to claim 1 wherein:
the rotor comprises at least one magnetic field source and the stator comprises at least two magnetic field detectors arranged at positions which are asymmetric relative to the center of the rotor, and
the processor is configured to process both a rotation speed and a direction of rotation of the rotor from the signals from the at least two magnetic field detectors.

9. A drilling apparatus for drilling a borehole through an earth formation, comprising:
a drill bit connected to a downhole turbine which comprises a central turbine element rotatably housed within a housing at the bottom end of a drillstring in the borehole wherein the drill bit is connected to the central turbine element, and wherein the turbine is configured in use to be driven into motion by drilling fluid pumped down the borehole, the central turbine element comprising at least a first magnetic field source or at least a first magnetic field detector, and the housing comprising at least one a first magnetic field source if the turbine element comprises a first magnetic field detector or comprising at least one a first magnetic field detector if the central turbine element comprises a first magnetic field source; wherein either:
(i) the central turbine element or the housing comprises both the first magnetic field source and a second magnetic field source, distinctive from the first, arranged never to be collinear with the centre of the central turbine element at any point during a full revolution of the central turbine element within the housing; or
(ii) the central turbine element or the housing comprises both the first magnetic field detector and a second magnetic field detector; and
a processor configured to process signals generated by the at least one magnetic field detector, wherein the processor is configured to process a rotation speed and a direction of rotation of the central turbine element from the signals from the at least one magnetic field detector.

10. A drilling apparatus according to claim 9 wherein the at least one magnetic field detector comprises a total field magnetometer.

11. A method of operating a downhole motor comprising a rotor within a housing at the bottom end of a drillstring in a borehole, comprising driving the rotor into motion relative to the housing by pumping drilling down the borehole and between the rotor and the housing, the method further comprising:
using at least a first magnetic field detector to measure a magnetic field generated by a relative rotation of at least a first magnetic field source, wherein the first magnetic field detector is coupled with the housing when the first magnetic field source is coupled with a rotor and the first magnetic field detector is coupled with the rotor when the first magnetic field source is coupled with the housing; wherein either:
(i) the rotor or housing comprises both the first magnetic field source and a second magnetic field source, distinctive from the first, arranged never to be collinear with the centre of the rotor at any point during a full revolution of the rotor within the housing; or
(ii) the rotor or housing comprises both the first magnetic field detector and a second magnetic field detector; and
using a processor to process the measured magnetic field to process a rotation speed and direction of the rotor.

12. A method according to claim 11, wherein the rotation speed is determined by measuring the time between peaks and/or troughs in the measured magnetic field.

13. A method according to claim 11, wherein the rotation speed is determined by performing a frequency analysis on the measured magnetic field.

14. A method according to claim 11, wherein the processor determines a direction of motion of the rotor by cross-correlating a measured magnetic field experienced by at least two magnetic field detectors.

15. A method according to claim 14, wherein the direction of motion is determined by comparing the time between peaks and/or troughs of at least two distinctive detected magnetic fields.

16. A method according to claim 11, further comprising:
transmitting the measured magnetic field or the rotation speed to a surface location.

17. A method according to claim 16, wherein the measured magnetic field or the rotation speed is transmitted using wired pipe.

18. A method according to claim 11 wherein the magnetic field detector comprises a total field magnetometer.

* * * * *